Figure 1:
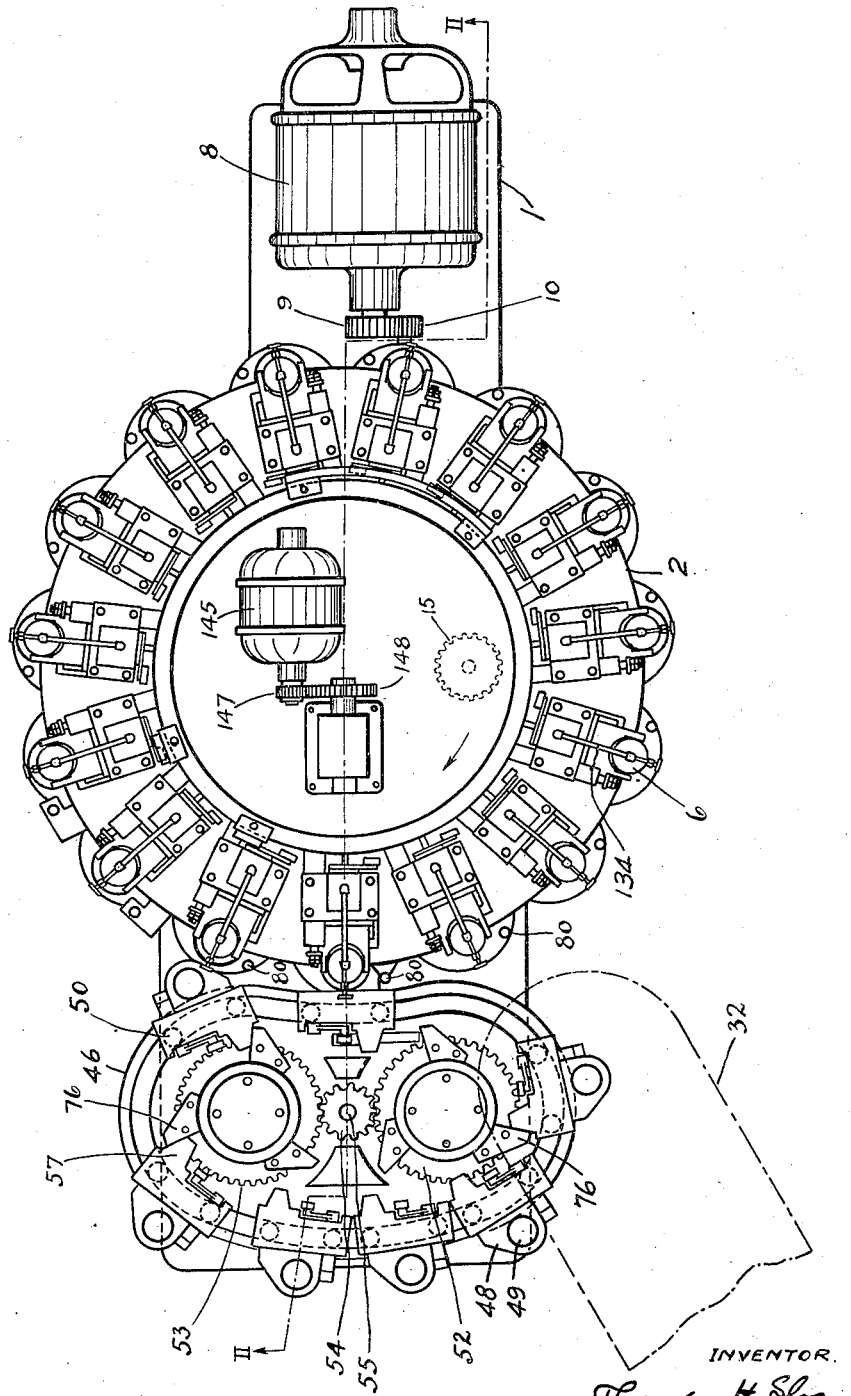

Feb. 16, 1932. T. H. SLOAN 1,845,525
GLASS FORMING MACHINE
Filed May 24, 1928    8 Sheets-Sheet 2

INVENTOR
Theodore H. Sloan
by Brown & Critchlow
his attorneys.

INVENTOR
Theodore H. Sloan
by Brown & Critchlow
his attorneys.

Feb. 16, 1932. T. H. SLOAN 1,845,525
GLASS FORMING MACHINE
Filed May 24, 1928 8 Sheets-Sheet 7
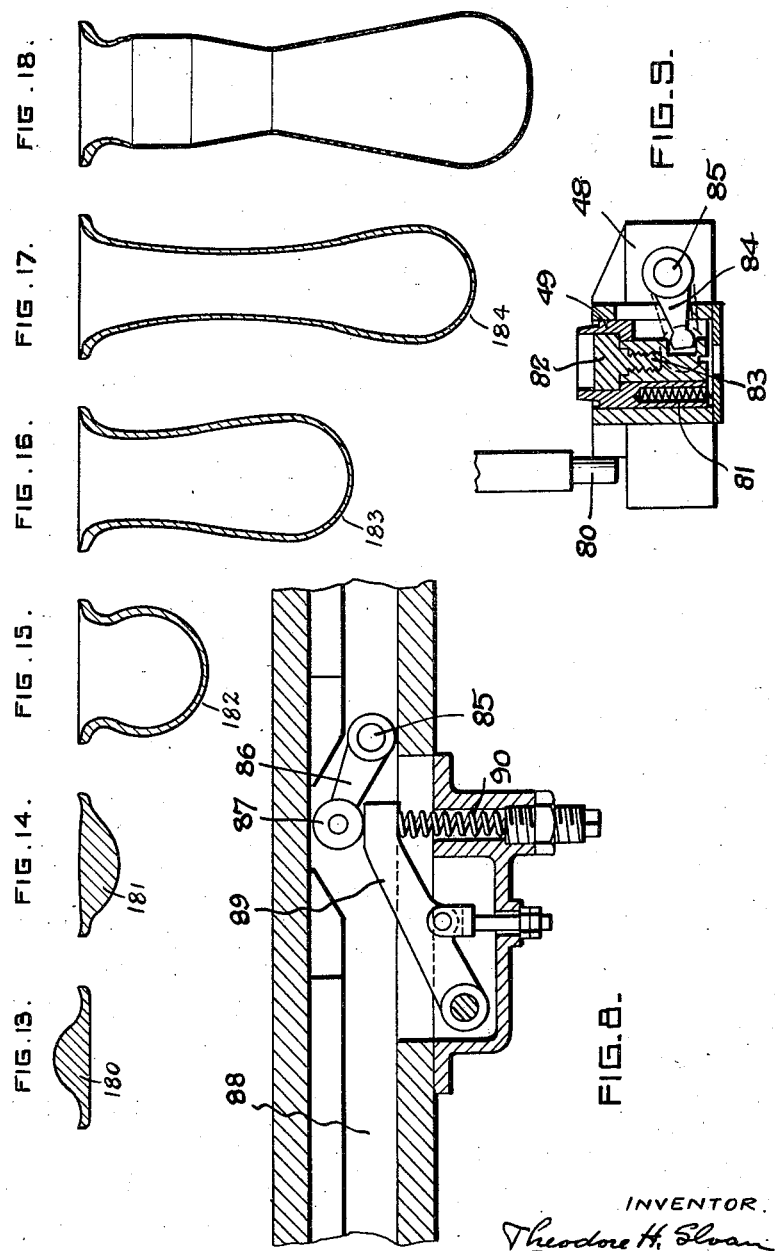

Feb. 16, 1932.   T. H. SLOAN   1,845,525
GLASS FORMING MACHINE
Filed May 24, 1928   8 Sheets-Sheet 8
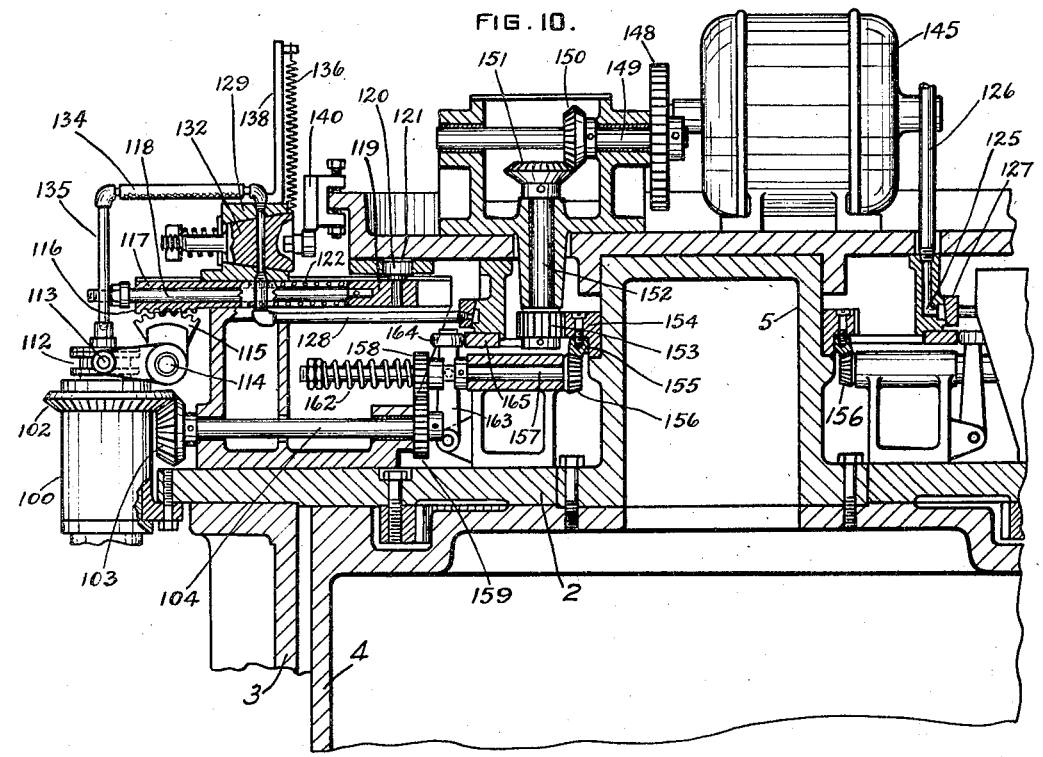
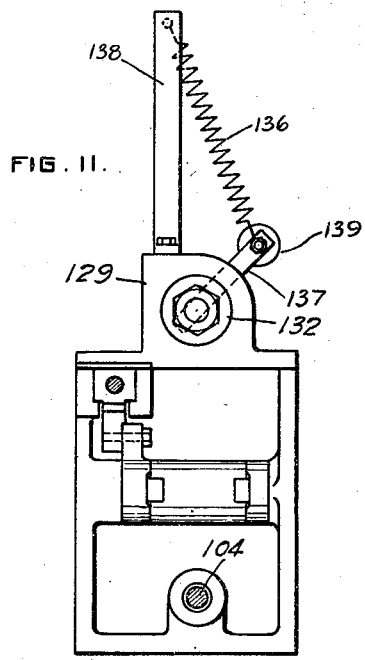
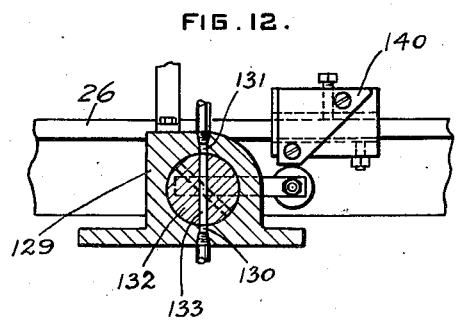
INVENTOR
Theodore H. Sloan
by Brown & Critchlow
his attorneys.

Patented Feb. 16, 1932

1,845,525

UNITED STATES PATENT OFFICE

THEODORE H. SLOAN, OF CHARLEROI, PENNSYLVANIA, ASSIGNOR TO MACBETH-EVANS GLASS COMPANY, A CORPORATION OF PENNSYLVANIA

GLASS FORMING MACHINE

Application filed May 24, 1928. Serial No. 280,240.

The invention relates to the manufacture of glass articles, particularly paste mold blown articles such as electric lamp bulbs, lamp chimneys, tumblers, and the like, the expression "paste molds" being here used to designate glass blowing operations in which the articles being blown are rotated in molds during the blowing operations, as is the prevailing practice in the blowing of electric lamp bulbs, lamp chimneys, and some forms of tumblers.

In the hand production of paste mold glass articles, the practice is, and from time out of mind has been, for a workman to gather a body of glass on the end of a blow pipe, and thereafter marver the gather to preliminarily shape it and chill its outer surface to form a skin having a suitable heat gradient. The workman then puffs the marvered blank while holding the blow pipe upwardly and rotating it continuously or intermittently as may be required. He then swings the blow pipe with the puffed blank in a downward position to properly elongate and enlarge the blank, after which he places it in a mold for final blowing during which the blank is rotated within the mold or the mold is rotated with relation to the blank.

Within the past several years, commercially successful machines have been produced for the manufacture of this type of glass-ware. However, it is characteristic of such machines that their mechanism is constructed and operated to simulate the procedure of hand manufacture. Parisons or blanks are formed on the upper ends of vertically disposed blow heads, and in such positions of the blow heads the blanks are puffed. The blow heads are then turned downwardly while puffing continues, and the heads are simultaneously rotated on their longitudinal axes. Thereafter, the heads are usually swung in their downward positions to elongate the blanks which are then enclosed in molds for final blowing, the blanks being rotated in the molds during such blowing.

The object of this invention is to provide a simplified method of manufacturing paste mold glass articles, and to provide simple and effective apparatus whereby the method may be economically practiced, and on which other types of glassware may be made.

The invention is predicated largely upon my discovery that by forming, at the lower end of a vertically disposed blow head, a parison of a particular shape, the parison may be developed and blown in a paste mold while the blow head is maintained in its vertically disposed position. As to shape, the parison, when attached to a blow head in the position stated, has a horizontal diameter greater than its thickness, and it is thicker at its center than at its edge. In general the parison may be said to be button-shaped. When it is so formed, it may be preliminarily developed for final blowing in a mold by either puffing or gradually blowing it in its suspended laterally-unconfined position, either with or without rotating it on its vertical axis.

For the practice of this method I provide a glass blowing machine having a movable element, preferably in the form of a rotatable turret, provided with a plurality of vertically disposed blow heads, and also provided with a plurality of partible molds associated with the blow heads. In association with a source of glass supply, and in coordination with the operation of the blowing machine, I provide means for transferring successive gathers or gobs of glass from its source to the blow heads, and provide means for applying each gather to the lower end of a blow head in the form of a button-shaped parison. The blowing machine is provided with mechanism which becomes effective after such a parison is so applied to a blow head to preliminarily blow or puff the parison while laterally unconfined to develop a paste mold blank suspended from the head, and to thereafter give the suspended blank a final blow in a mold while effecting relative rotation between the mold and the blank, the rotation preferably being effective by rotating the blank. Although various means may be provided for transferring successive bodies of glass from the source of supply and for applying them in the form of button-shaped parisons successively to the several blow heads, the gathers are preferably received from the source by receiving cups which move between the source of supply and the blowing machine, and which are provided with vertically movable bottoms to elevate the gathers to and mold them in proper form upon the lower ends of the blow heads.

Figure 2:
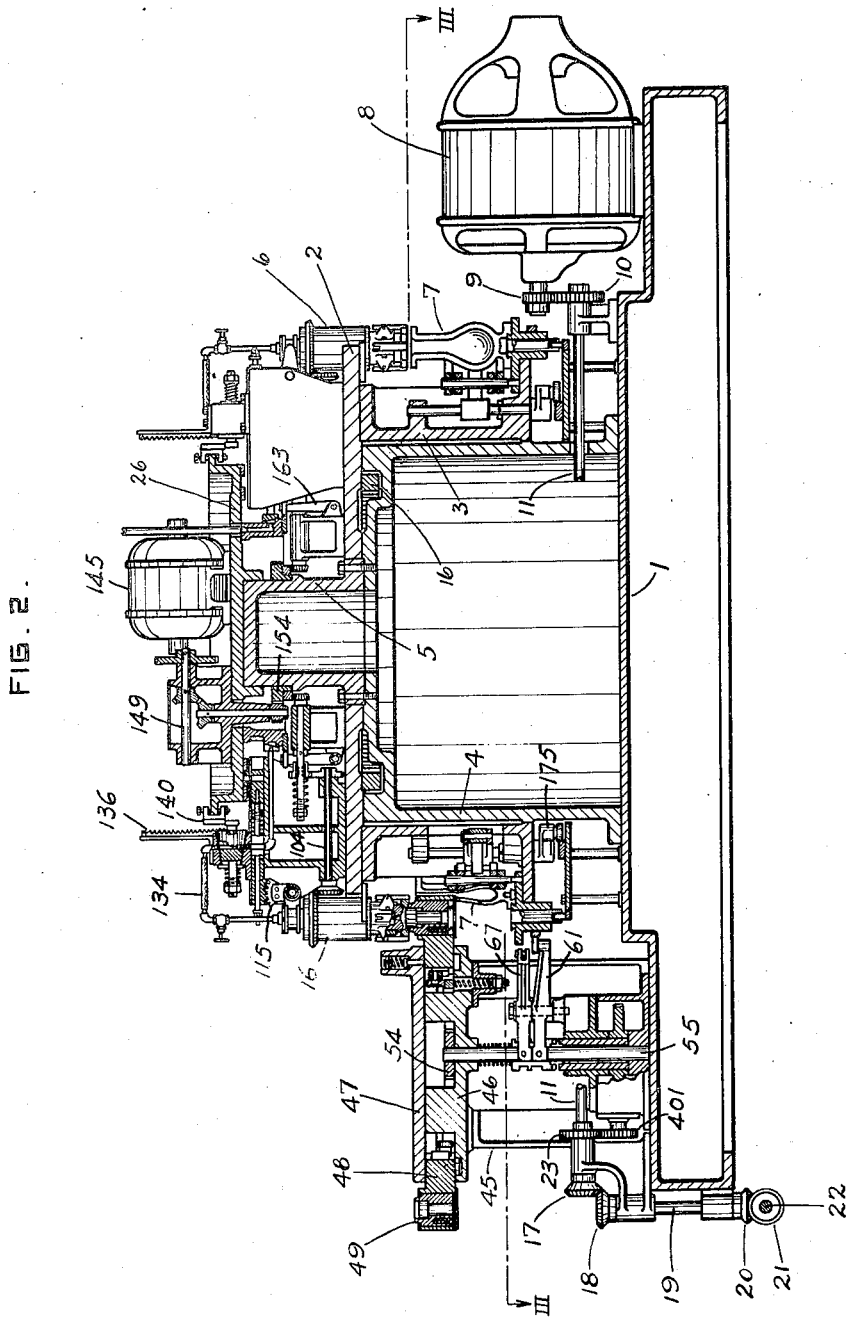
Figure 3:
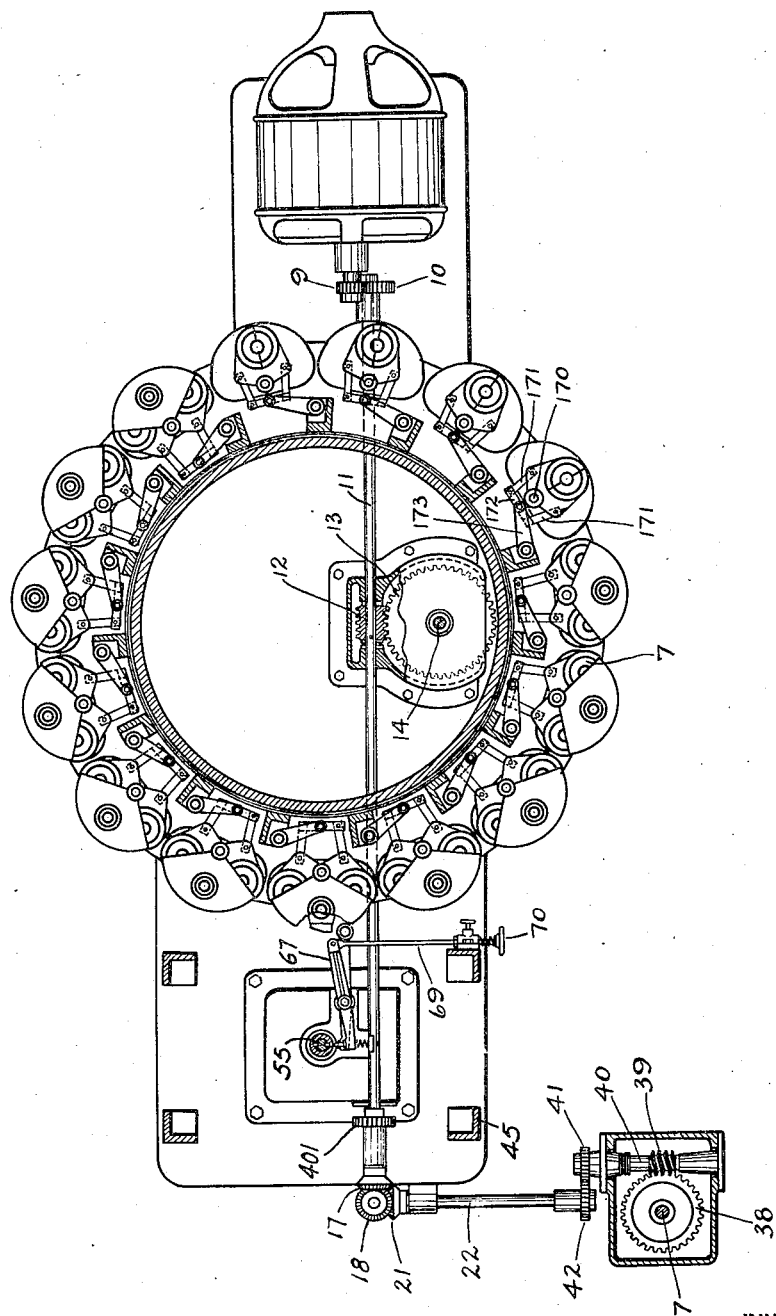
Figure 4:
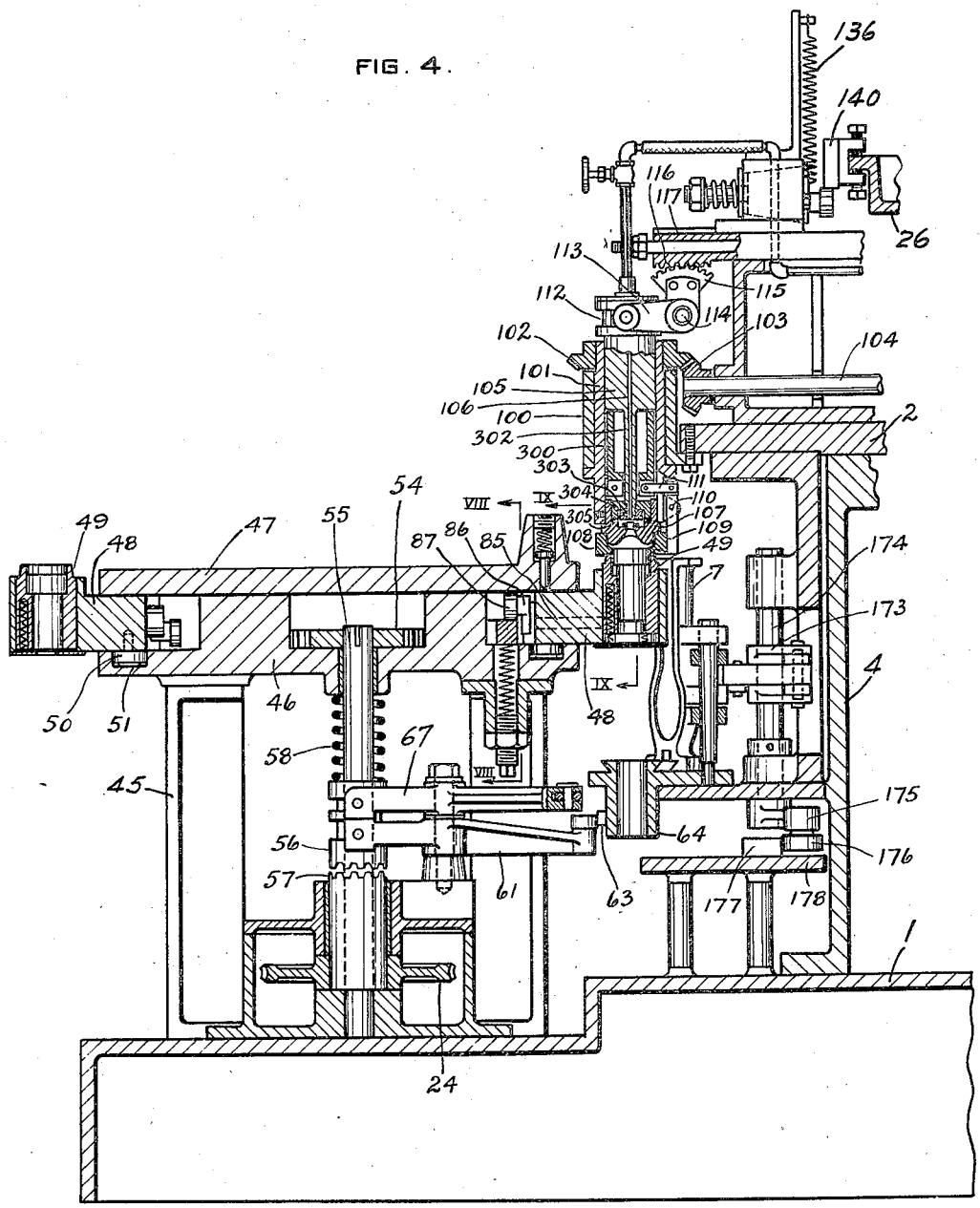
Figure 5:
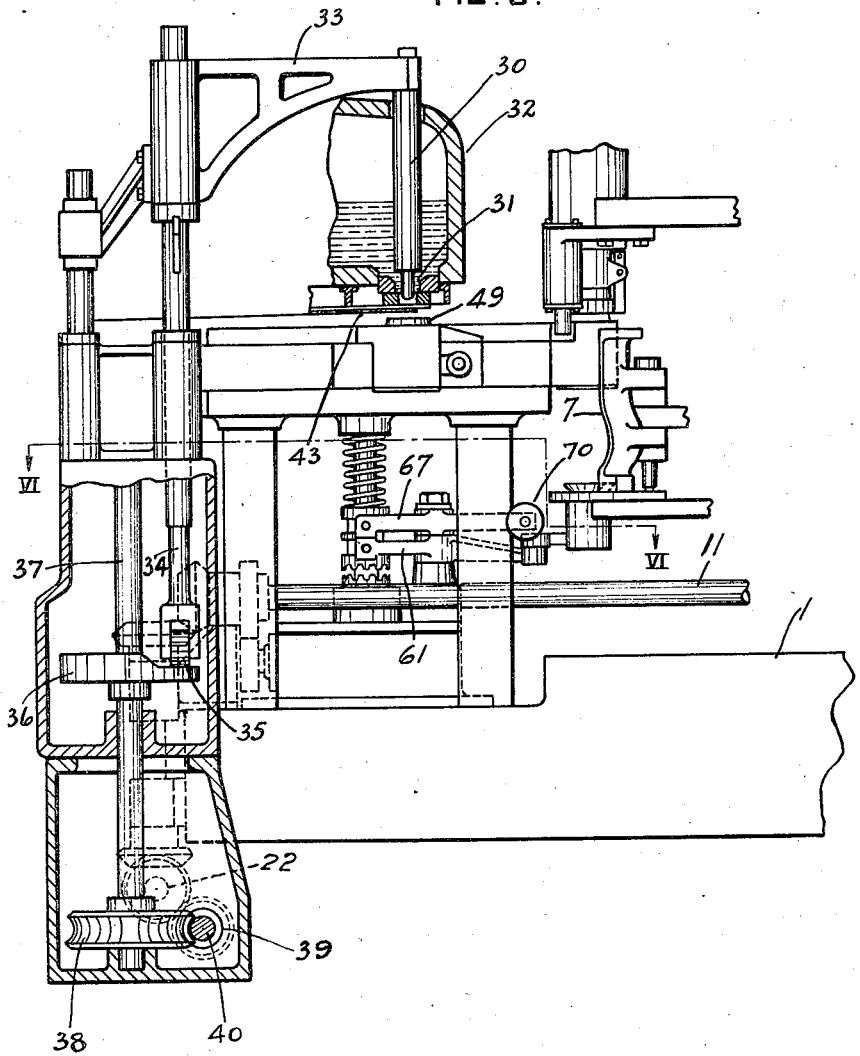
Figure 6:
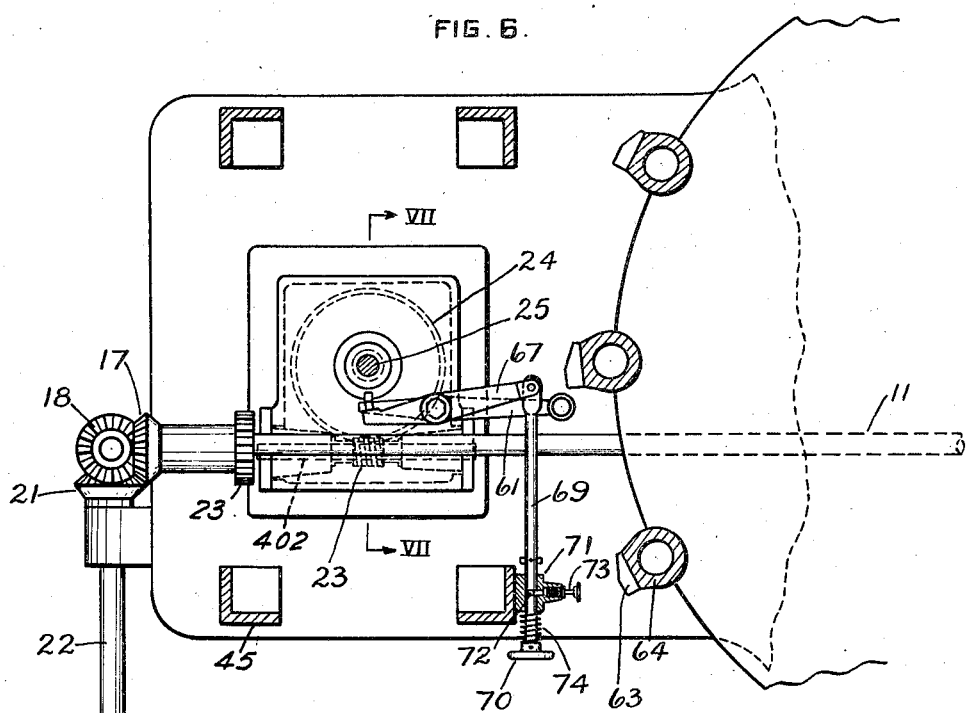
Figure 7:
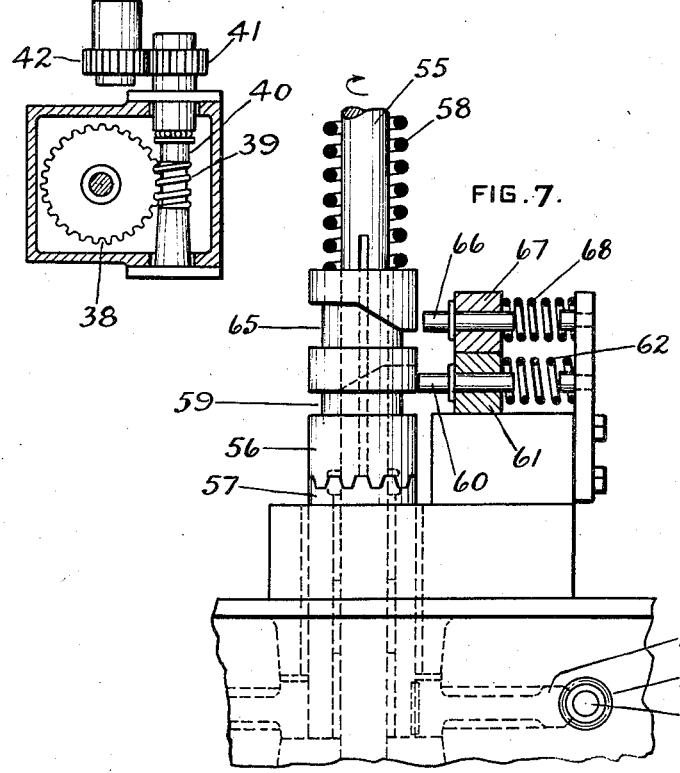

The invention will be further explained in connection with the description of the apparatus illustrated herein for practicing it. In the drawings Fig. 1 is a plan view of a blowing machine and gather-transferring apparatus associated with it, the forehearth of a glass furnace being diagrammatically illustrated adjacent the transfer apparatus; Fig. 2 a vertical sectional view taken on the broken line II—II, Fig. 1; Fig. 3 a horizontal sectional view taken on the line III—III, Fig. 2; Fig. 4 a vertical sectional view to enlarged scale of the left-hand end of Fig. 2; Fig. 5 an elevation to enlarged scale of a glass feeding mechanism associated with the transfer apparatus, certain portions being broken away and shown in section to illustrate details of construction; Fig. 6 a horizontal sectional view taken on the broken line VI—VI, Fig. 5; Fig. 7 a vertical sectional view taken on the line VII—VII, Fig. 6; Fig. 8 a vertical sectional view of a detail of the transfer mechanism taken on the line VIII—VIII, Fig. 4; Fig. 9 a vertical sectional view of another detail of the transfer apparatus taken on the line IX—IX, Fig. 4; Fig. 10 a vertical sectional view to enlarged scale corresponding to the upper left-hand portion of Fig. 2; Fig. 11 a front elevation of a valve for controlling blowing air; Fig. 12 a vertical sectional view through the valve of Fig. 11 and an elevation of an actuating member for the valve; and Figs. 13 and 18, inclusive, vertical sectional views illustrating the various stages of development of a parison into a blown electric lamp bulb.

Having reference to the illustrative embodiment of the invention, and particularly to Figs. 1, 2 and 3, the glass forming machine and transferring apparatus are shown as mounted on a bed frame 1. The forming machine is borne largely by a rotatable turret comprising a plate 2 and a cylindrical apron 3 attached to and extending downwardly from the outer portion of the plate. The turret is supported by a drum 4 resting upon and attached to frame 1, the central portion of the drum having attached to it an upwardly extending column 5 which supports a frame platform 26. At suitably spaced intervals, the turret is provided with a plurality of vertically disposed blow heads 6 having their glass-receiving ends lowermost, and with a plurality of partible molds 7, one being arranged for cooperation with each blow head. The construction and operation of the blow heads and molds will be explained after describing the mechanism for delivering glass from a source of supply and transferring it to the blow heads. The blowing machine turret is preferably continuously rotated by a motor 8 mounted on frame 1, the motor armature being provided with a pinion 9 meshing with a gear 10 attached to a shaft 11, which shaft is provided with a worm 12 meshing with a worm wheel 13 mounted on a vertically disposed shaft 14. The upper end of shaft 14 is provided with a pinion 15 (Fig. 1) which meshes with an internal gear 16 (Fig. 2) attached to the lower face of turret plate 2.

As shown in Figs. 2 and 3, power shaft 11 extends to the left end of frame 1 where it is provided with a bevel pinion 17 meshing with a similar pinion 18 mounted on the upper end of a shaft 19. The lower end of this shaft is provided with a bevel pinion 20 meshing with a similar pinion 21 attached to a shaft 22 for operating a glass feeder presently to be described. Also, as shown in Figs. 2 and 6, power shaft 11 is provided with a pinion 23 meshing with a pinion 401 attached to a counter shaft 402 which is provided with a worm wheel 24 attached to a shaft 25 for operating glass transfer apparatus presently to be described. It will thus be seen that driving connections extend from a single motor for coordinate operation of the glass feeder and transfer apparatus, and for coordinate rotation of the forming machine turret.

The detailed construction of the glass feeder, transfer apparatus and blowing machine will now be described in the order stated.

Feeder

The invention is unlimited to any particular type of glass feeding or delivering apparatus. In the manufacture of some forms of paste mold glassware, particularly small size glassware, the operation of the machine is so rapid that it is desirable to use a stream feeder of the Brooks or other suitable type. In other cases, a gob feeder such as that shown particularly in Fig. 5 may be used. This feeder comprises a reciprocatory needle 30 adapted to operate in, and control flow through, an orifice 31 in the bottom of a forehearth 32 leading from a glass melting tank or other source of glass supply. Needle 30 is attached to the outer end of an arm 33 which is secured to the upper end of a vertically reciprocable shaft 34, the lower end of which is provided with a roller 35 resting upon a suitable cam 36 attached to a rotary shaft 37. This shaft is provided at its lower end with a worm wheel 38 meshing with a worm 39 (Fig. 3) attached to a shaft 40 which is provided with a pinion 41 meshing with a pinion 42 attached to rotary shaft 22. Rotation of shaft 37 through the driving connections just explained causes shaft 34 to reciprocate vertically, and such reciprocation is imparted to needle 30 to control flow of glass through orifice 31, the glass being automatically severed by suitable shears 43 in the well known or any desired manner. Because the driving connections for the feeder are directly connected to those for rotating the turret of the blowing machine, it will be understood that the feeder is operated in coordination with the rate of rotation of the turret.

*Transfer apparatus*

While the gathers of glass taken from the source of supply may be variously transferred to the blowing machine and there successively applied to the lower ends of the blow heads, it is preferred to provide a plurality of movable cups for this purpose. Supported on frame 1 by posts 45 (Fig. 2) there is a runway formed between the outer edges of a base casting 46 and a top plate 47, in which runway there are mounted a plurality of blocks 48 each provided with a glass-receiving cup 49. To lock the blocks 48 in the runway, and also to reduce their resistance to movements along the runway, the lower face of each block may be provided with a pair of rollers 50 (Figs. 1 and 4) which ride in a groove 51 formed in the upper face of base 46.

At such time as a cup 49 is receiving glass from a feeder or other source of supply, it is desirable to have the cup stationary, and, when the cup is applying its charge of glass to a blow head, it is desirable to have the cup move continuously with the turret of the forming machine. To such end, provision is made for intermittently advancing the receiving cups in their runway except while they are applying their charges to the blow heads, at which time the blocks in which the receiving cups are mounted are engaged and moved by the turret, as will presently be explained more in detail. For the intermittent movements of the cups, there are rotatably mounted on the upper face of base 46 a pair of gears 52 and 53 (Fig. 1) which mesh with the opposite sides of a pinion 54 attached to the upper end of a shaft 55. Gears 52 and 53 are provided with a plurality of suitably spaced fingers 76 adapted to engage lugs 57 formed on the inner sides of receiving cup blocks 48. To illustrate these gears and the fingers attached to them plate 47 of the receiving cup runway is shown as being removed in Fig. 1.

Having reference particularly to Figs. 4, 6 and 7, shaft 55 is provided with a clutch element 56 which is splined upon the shaft for rotation with and longitudinal movement upon it. Below clutch element 56 there is a cooperating clutch element 57 formed on the upper end of a sleeve to which worm wheel 24 is attached. In Fig. 4 the clutch is shown in its released, and in Fig. 7 in its applied position, it being normally held in its applied position by a spring 58. For intermittently releasing clutch element 56, it is provided with a peripheral cam groove 59 adapted to receive a pin 60 borne by the outer end of a rocker arm 61 normally urged by a spring 62 towards cam groove 59 of the clutch.

Pin 60 is intermittently removed from cam groove 59 by a series of dogs 63 borne by mold supports 64 attached to the forming or blowing machine turret, these dogs being adapted to engage a roller attached to the outer end of arm 61. When this pin is so removed, spring 58 presses clutch element 56 into engagement with its cooperating element 57 to cause shaft 55 to rotate. After a dog 63 is passed beyond the outer end of arm 61, spring 62 forces pin 60 against the periphery of clutch element 56 above the narrow portion of cam groove 59, and when the wide portion of this groove comes opposite to the pin, the pin enters the wide portion of the groove, and further rotation of shaft 55 causes the inclined portion of the groove to bear against the top of the pin and elevate clutch element 56 to release the clutch. The arrangement here, including the several interposed driving gears and pinions, is such that fingers 76 on gears 52 and 53 (Fig. 1) advance receiving cups 49 the required amounts at the required intervals.

When abnormal conditions of operation arise, it may be desirable to interrupt the movements of the receiving and transfer cups. For this purpose, the clutch element 56 is provided with a second cam groove 65 similar to cam groove 59 but so disposed that its wider portion is opposite the narrower portion of groove 59. Adjacent to cam groove 65 there is a pin 66 attached to the inner end of an arm 67 which is urged yieldingly towards groove 65 by a spring 68. To the outer end of arm 67 there is attached a rod 69 provided at its outer end with a handle 70. This rod extends through a sleeve 71, and within such sleeve it is provided with a groove 72 adapted to receive the inner end of a pin 73 urged yieldingly towards the groove.

When it is desired to temporarily discontinue the movements of the receiving cups, pin 73 is moved outwardly so that spring 68 back of arm 67, and also a spring 74 surrounding the outer end of rod 69, become effective to move the inner end of arm 67 towards and into cam groove 65. Pin 66 then becomes effective to maintain clutch element 56 in its elevated position at such times as pin 60 is intermittently moved from cam groove 59 through the action of dogs 63. The net result of this is that the clutch element is continuously held in its upward clutch-braking position until rod 69 is again pushed inwardly and locked in its inward position by pin 73.

Adjacent to the glass forming machine, the receiving cup guide is of arcuate form concentric with the vertical axis of rotation of the turret. For moving each receiving cup along this arcuate portion of the runway while the cup is applying its charge of glass to the lower end of a blow head, the turret is provided with a plurality of projections 80 (Fig. 1) which engage receiving cup blocks 48 and cause them to move in their runway at the rate of rotation of the turret. When being so moved, the blocks are not engaged by fingers 76 on gears 52 and 53.

Each receiving cup is provided with a vertically movable bottom, and, for applying and molding gathers of glass on the lower ends of the blow heads, provision is made for elevating the bottom of each receiving cup when in registration with a blow head and while the receiving cup is moving along the arcuate portion of the runway. As shown in Figs. 4, 8 and 9, each receiving cup is urged yieldingly upwardly in its supporting block 48 by springs 81, and each is provided with a vertically movable bottom 82 to the lower end of which there is attached a stem 83 engaged by the outer end of a finger 84 attached to a rock shaft 85. This shaft extends through block 48 and is provided on its inner end with a lever 86 to which there is attached a roller 87 which runs in a groove 88 formed in the receiving cup guideway. In the arcuate portion of this guideway, groove 88 extends upwardly, as shown in Fig. 8, the bottom of its upwardly extending portion being formed by a finger 89 yieldingly urged upwardly by a spring 90. Thus when a receiving cup comes into registration with the lower end of a blow head, lever 86 is swung upwardly in groove 88 to rotate shaft 85 and cause its attached finger 84 to elevate bottom 82 of the receiving cup. This causes the gather of glass carried by the receiving cup to be molded on the bottom of the blow head in button-shaped form, as will presently be more fully explained. When lever 86 passes beyond the upwardly turned portion of groove 88, this lever is again lowered to depress the bottom of the receiving cup, and also to depress the receiving cup which is urged upwardly by springs 81. Spring 90 which bears upwardly against finger 89 places a yielding pressure upon the bottom of the receiving cup and compensates for such variations as there may be in the sizes of the gathers of glass.

*Blowing machine*

The essential elements of the blowing machine comprise blow heads 6 and partible molds 7. Each blow head is provided with a movable chuck for retaining the glass attached to it until completely blown, and is also provided with mechanism for controlling the puffing and blowing air, and for rotating the blow head and for opening and closing each mold at the desired times. The construction and operation of the blow heads will now be explained, and thereafter the construction and operation of the molds.

As seen particularly in Fig. 4, each blow head comprises an outer casing 100 attached to the periphery of turret plate 2. Within the casing there is rotatably mounted a sleeve 101 provided at its upper end with a bevel gear 102 which meshes with a bevel pinion 103 attached to a shaft 104 rotated in a manner presently to be explained. Within sleeve 101 there is a cylinder 105 which is splined to sleeve 101 for longitudinal movement in and rotation with it, and which is integrally provided at its lower end with a centrally disposed small section 302, through which, and through cylinder 105, there is a passage 106 for blowing-air terminating at the center of a parison mold 107 at the bottom of the blow head. Attached to the lower end of section 302, there is a nut 303 for clamping to such section an inverted cup-shaped member 304, the lower edge of which is adapted to seat upon a lead washer 305, or other form of gasket borne by sleeve 101, to prevent the escape of blowing-air. Within sleeve 101 and below the lower end of cylinder 105, there is a tubular casing 300 provided with radially disposed openings in which there are arranged the inner ends of links 111 pivotally attached to the casing. The outer ends of these links are pivotally connected to levers 109, pivoted at 110 to sleeve 101, and provided at their lower ends with chuck elements 108 for attaching parisons of glass to the blow head. In a manner presently to be explained, provision is made for moving tubular casing 300 vertically to open and close chuck elements 108 through connecting links 111 and levers 109.

For effecting the necessary vertical movements of cylinder 105 to open and close a chuck, the upper end of the cylinder is provided with a groove 112 engaged by pins formed on a yoke 113 which is attached to a rocker shaft 114. Connected also to this shaft there is segmental pinion 115 which meshes with a rack 116 formed on the lower face of a sleeve 117 mounted for radial reciprocation within the turret. Extending through sleeve 117 there is a rod 118 (Fig. 10) attached at its inner end to a block 119 provided with a roller 120 which rides in a cam groove 121 formed in the upper portion of the turret, and between block 119 and the inner rod of sleeve 117 there is a spring 122. Cam groove 121 is so formed that at the proper intervals it causes block 119 to move outwardly and inwardly, thereby causing, through the train of connections just explained, blow head cylinder 105 to move downwardly and upwardly. When cylinder 105 is in its downward position indicated in Fig. 4, the lower end of cup-shaped member 304 prevents the escape of blowing-air between the lower end of section 302 and mold 107. Upon the upward movement of cylinder 105, nut 303 and member 304 are first raised to open a passage between the lower end of member 304 and ring 305 so that the interior of a blown article may be exposed to atmospheric pressure. Further upward movement of cylinder 105 causes the upper end of member 304 to engage the lower end of tubular casing 300 which is then caused to rise with cylinder 105. This raising of tubular casing 300 causes the inner ends of links 111 to move upwardly, the outer ends of levers 109 to move inwardly, and the lower ends of these levers to move outwardly to open the chuck to release a blown article.

While air under different pressures may be used for puffing and blowing, I have found that air under a single pressure may be used for both of these operations. The machine frame is provided with an annular air supply groove 125 (Fig. 10), open at its periphery, and connected by a pipe 126 to a suitable source of supply. Surrounding and closing this groove and forming part of the turret, there is a ring 127 which is tapped to receive the inner ends of pipes 128, one of which is provided for each blow head. This pipe terminates in a valve comprising a casing 129 provided with inlet and outlet ports 130 and 131, and a spindle 132 provided with a transverse passage 133. Connected to and extending from casing port 131 there is a flexible pipe 134 which is attached to the upper end of a pipe 135, the lower end of which is connected through suitable instrumentalities to the upper end of blow head cylinder 105 and in communication with passage 106 through the cylinder. Normally, valve spindle 132 is held in valve closing position by a spring 136 attached at its lower end to the outer end of an arm 137 secured to the spindle, and attached at its upper end to an arm 138 attached to the valve casing. Spindle arm 137 is provided with a roller 139 adapted to be engaged and depressed by detents 140 which may be adjustably clamped to the machine turret. For a short blow or puff given to a blank in its preliminary forming, the detents 140 may be short, as shown in Fig. 12, and for the final blowing a long detent is used, its length depending upon what portion of the cycle of rotation of the turret is necessary or desirable to utilize in the final blowing operation. During puffing and blowing operations, the passage 133 of valve spindle 132 is in the position indicated by the full lines in Fig. 12, and when blowing and puffing is not taking place, this passage is in its dotted line position in which flow of air is shut off.

During a blowing operation, and also during the preliminary blank-forming operations in the manufacture of some forms of paste mold glassware, the blow heads are rotated on their vertical axes. For this purpose, there is mounted on the turret a motor 145 (Figs. 1 and 10), the rotor of which is provided with a pinion 147 which meshes with a gear 148 attached to a shaft 149. This shaft is also provided with a bevel pinion 150 which meshes with a similar pinion 151 attached to the upper end of a shaft 152, the lower end of which is provided with a pinion 153 which meshes with a ring gear 154 rotatably mounted on the periphery of column 5 of the machine frame. Ring 154 is provided with a bevel gear ring 155 which meshes with bevel pinions 156 connected to driving connections extending to each of the blow heads. As seen in Fig. 10, each pinion 156 is attached to a shaft 157 provided with a clutch gear 158 longitudinally movable upon the shaft to and from meshing engagement with a cooperating clutch gear 159. The latter gear is attached to shaft 104, to the outer end of which there is connected bevel pinion 103 meshing with bevel gear 102 attached to the upper end of blow head sleeve 101, as previously explained.

For making and breaking driving connections between clutch gears 158 and 159, the former is urged towards clutch making position by a spring 162, and is moved in the opposite direction by a lever 163 which engages a sleeve attached to clutch gear 158, and which is provided with a roller 164 bearing upon a cam 165 attached to the upper portion of the machine frame. At such portions of the cycle of rotation of the turret as it is desired to interrupt or discontinue the rotation of the blow heads, the peripheral face of cam 165 extends outwardly beyond that shown in Fig. 10 sufficiently to cause lever 163 to move outwardly and release clutch gear 158 from the clutch gear 159.

Having reference now to the construction of the molds, and referring particularly to Figs. 3 and 4, each mold 7 is formed of two parts pivotally connected to each other at 170, and to each mold part there is connected the outer end of a yielding link 171, the inner ends of which are connected to a floating lever 172, pivotally attached at its center to the outer end of an arm 173. The inner end of this arm is connected to a vertically disposed shaft 174 rotatably mounted in the turret and provided at its lower end with an arm 175 to which there is attached a roller 176 which bears upon a cam 177 attached to a table 178 forming a part of the machine frame. Cam 177 is so formed that it causes arm 175 to move inwardly and outwardly to open and close the molds at the proper times.

*Operation*

Except for the rotation of the blow heads on their vertical axes, the several units of the apparatus are driven by motor 8 through coordinated driving connections, the turret 2, 3 being continuously rotated through power shaft 11, worm gear 12, worm wheel 13, vertical shaft 14, gear 15 and internal gear 16 (Figs. 1, 2 and 3); the receiving and transfer cups 49 being intermittently advanced through power shaft 11 (Figs. 1, 6 and 7) worm gear 23, worm wheel 24, clutch elements 57 and 56, shaft 55, pinion 54 and gears 52 and 53; and feeder needle 30 being vertically reciprocated through power shaft 11 (Figs. 2, 3, 5 and 6) pinions 17 and 18, shaft 19, pinions 20 and 21, shaft 22, pinions 42 and 41, shaft 40, worm gear 39, worm wheel 38, shaft 37, cam 36, reciprocating shaft 34 and arm 33. The turret is rotated in a clockwise direction and the receiving cups are moved in their runway in a counter clockwise direction, as these parts are viewed in Fig. 1. The timing of the operation of the feeder and of the movements of the receiving cups is such that a receiving cup is stationary beneath the orifice 31 of the forehearth 32 (Fig. 5) as a gather or gob of glass is discharged from the feeder. Just after the gather or gob is severed by shears 43 the receiving cup advancing mechanism, through gear 52 and a finger 76 attached to it, advances the receiving cup to a position where it is engaged by a turret projection 80 which then moves the receiving cup at the rate of rotation of the turret. While the receiving cup is being thus moved by the turret, the bottom 82 of the cup (Figs. 8 and 9) is moved upwardly by lever arm 86, rock shaft 85, finger 84 and stem 83 depending from the movable bottom 82, arm 86 being moved by the groove 88 in the receiving cup guideway. The bottom of the receiving cup and mold 107 at the lower end of the blow head cylinder 105 mold the gather of glass into a parison of the form indicated at 180 in Fig. 13. This parison is of button-shaped form, having a horizontal diameter greater than its thickness, and being thicker at its center than at its edge. The parison is engaged at its edge by chuck elements 108, which, when the glass is applied to the blow head, are in their inward glass-engaging position so that a portion of the gather is pressed outwardly between the lower lips of the chuck and the outer portion of mold 107. Further movement of the turret results in the bottom 82 of the receiving cup being lowered, and also in the lowering of the receiving cup which is engaged by the outer portion of its bottom. The parison is then free to sag downwardly in the general manner indicated at 181 in Fig. 14, so that between the upper face of the parison and the lower face of mold 107 there is a space for puffing air to act upon the upper face of the parison. Further movement of the turret moves the receiving cup beyond its engagement by the projection 80, the cup then being moved intermittently by fingers 76 of gear wheel 53 (Fig. 1).

The parison being thus molded on the lower end of a blow head, its development into a paste mold blank proceeds as the turret continues to move. This development of the parison is effected by puffing, and in some cases by either continued or intermittent rotation of the blow head while the parison remains laterally unconfined and suspended from the blow head. The puffing of a blank is effected by the rotation of valve spindle 132 (Figs. 10, 11 and 12), the arm 137 of which engages detents 140 attached to the periphery of the upper portion of the machine frame. These detents depress arm 137 to bring passage 133 of the spindle into registration with ports 131 and 130 of the valve casing so that air may then flow through the valve and the passage 106 of the blow head cylinder 105. The rotation of the blow head on its vertical axis is effected by motor 145 (Figs. 1 and 10) through pinion 147, gear 148, shaft 149, bevel pinions 150 and 151, shaft 152, pinion 153, ring gear 154, bevel ring gear 155, bevel pinion 156, shaft 157, clutch gears 158 and 159, shaft 104, bevel pinions 103, and 102, and cylinder 101 of the blow head. The connections between ring gear 154 and shaft 104 are made and broken for effecting rotation of the blow head as desired by cam 165 (Fig. 10) acting upon lever arm 163 to move clutch gear 158 to and from engagement with clutch gear 159.

As the blank is thus puffed, and rotated on its vertical axis when resort is had to such rotation, it gradually elongates and its wall thickness gradually becomes thinner, as indicated at 182, 183 and 184 in Figs. 15, 16 and 17. The form of blank shown in Fig. 15 is that which it assumes as a result of the first puff, the form shown in Fig. 16 is that which it assumes as a result of a further puff, and the form shown in Fig. 17 is that which it assumes after it elongates subsequent to being puffed. When elongated to the form shown in Fig. 17, the blank is in readiness for being blown.

While a parison is being formed on a blow head, as well as during the preliminary forming of the parison into an elongated and relatively thin wall blank, the partible mold for the blow head is in open position. When the blank is developed to the form shown in Fig. 17, the mold closes upon it and final blowing ensues. The mold is closed by cam 177 (Fig. 4) which engages roller 176 at the outer end of arm 175 attached to rock shaft 174. The rotation of this shaft moves arm 173 (Fig. 3) outwardly, which, through floating lever 172 and resilient links 171 closes the mold. While the mold remains closed, blowing air is applied to the interior of the blank through valve spindle 132 and its operating mechanism previously explained. Normally the blowing continues for about the quarter of a complete rotation of the turret, and during such blowing the blank is continuously rotated within its mold. At the end of the blowing operation the air is shut off through valve spindle 132, and the mold remains closed a sufficient length of time to permit the pressure within the blown article to be relieved or reduced to substantially atmospheric pressure. The mold is then opened throughout the operating connections previously explained, and the blown article is then ready for removal from its blow head. This is done by causing blow head cylinder 105 (Fig. 4) to move upwardly, such movement causing the lower ends of chuck levers 109, and their attached chuck elements, to move outwardly, the blown article first being opened interiorly to atmospheric pressure. The blown article then drops upon a suitable receiving conveyor, or is otherwise disposed of.

According to the provisions of the patent statutes, I have explained the principle and mode of operation of my invention, and have illustrated and described what I consider to represent the best embodiment of the machine for glass blowing. However, I desire to have it understood that, within the scope of the appended claims, the invention may be practiced otherwise than as specifically described, and by mechanism other than that specifically illustrated.

I claim as my invention:

1. In a paste mold glass blowing machine, the combination of a vertically-disposed blow head, a mold, means for applying a button-shaped parison to the end of said head while downwardly disposed, means effective while the parison is laterally unconfined and while said head is maintained in its downward position for preliminarly blowing the parison to develop a paste mold blank suspended from said head, and means for effecting final blowing of the suspended blank in said mold while effecting relative rotation between the blank and mold.

2. In a paste mold glass blowing machine, the combination of a vertically-disposed blow head, a mold, means for applying a button-shaped parison to the end of said head while downwardly disposed, means effective while the parison is laterally unconfined and while said head is maintained in its downward position for preliminarily blowing the parison to develop a paste mold blank suspended from said head, and means for effecting final blowing of the suspended blank in said mold and for simultaneously rotating it within the mold.

3. In a paste mold blowing machine, the combination of a vertically-disposed blow head, a partible mold positioned below said head, means for applying a button-shaped parison to the end of said head while downwardly disposed and while the mold is open, means effective while the parison is laterally unconfined and while said head is maintained in its downward position for preliminarily blowing the parison to develop a paste mold blank suspended from said head, means for closing said mold upon the developed blank, and means for blowing the blank and rotating it within the mold.

4. In a paste mold glass blowing machine, the combination of a rotary turret provided with a plurality of vertically disposed blow heads and with partible molds positioned below said heads, means for applying button-shaped parisons successively to the ends of said heads while downwardly disposed and while their cooperating molds are open, means effective while each parison is laterally unconfined and while the head to which it is attached is maintained in its downward position for preliminarily blowing the parison to develop a paste mold blank suspended from a blow head, means for closing said molds successively upon the developed blanks, and means for blowing the blanks and rotating them within the closed molds.

5. In a paste mold glass blowing machine, the combination of a continuously rotatable turret provided with a plurality of vertically-disposed blow heads and with partible molds positioned below said heads, means for applying button-shaped parisons successively to the ends of said heads while downwardly disposed and while their cooperating molds are open and while said turret is rotating, means effective while each parison is laterally unconfined and while the head to which it is attached is maintained in its downward position for preliminarily blowing the parison to develop a paste mold blank suspended from a blow head, means for closing said mold successively upon the developed blanks, and means for blowing the blanks and rotating them within the closed molds.

6. The combination with a source of glass supply, of a paste mold glass blowing machine including a movable member provided with a plurality of vertically-disposed blow heads and a plurality of partible molds associated with the heads, means for receiving in succession charges of glass from said supply and for applying them successively in button-shaped parisons to the ends of said heads while downwardly disposed, and means for developing the parisons while suspended from said heads and while the heads to which they are attached are maintained in their downward positions, and means for later blowing the developed blanks while rotating them in said molds.

7. The combination with a source of glass supply, of a paste mold glass blowing machine including a continuously rotatable turret provided with a plurality of vertically-disposed blow heads and a plurality of partible molds associated with the heads, means for receiving in succession charges of glass from said supply and for transferring them from said source and for applying them successively in button-shaped parisons to the ends of said heads while downwardly disposed, and means for developing the parisons while suspended from said heads and while the heads to which they are attached are maintained in their downward positions, and means for later blowing the developed blanks while rotating them in said molds.

8. The combination with a source of glass supply, of a paste mold glass blowing machine including a movable member provided with a plurality of vertically-disposed blow heads and a plurality of partible molds associated with the heads, a plurality of cups for receiving in succession charges of glass from said supply, means for moving each cup from its glass-receiving position to a position beneath one of said blow heads, means effective when a cup is in its last-named position for transferring its charge in the form of a button-shaped parison to the lower end of a blow head while downwardly disposed, means for developing the parisons while suspended from said heads and while the heads to which they are attached are maintained in their downward positions, and means for later blowing the developed blanks while rotating them in said molds.

9. The combination with a source of glass supply, of a paste mold glass blowing machine including a continuously rotatable turret provided with a plurality of vertically-disposed blow-heads and a plurality of partible molds associated with the heads, a runway extending between said source of supply and blow heads, glass-receiving cups borne by said runway, means for discharging gathers of glass successively from said supply into said receiving cups, means for moving said receiving cups in said runway and for transferring the gathers of glass carried thereby to said blow heads while downwardly disposed, means for developing gathers while suspended from said heads and while the heads to which they are attached are maintained in their downward positions, and means for later blowing the developed blanks while rotating them in said molds.

10. The combination with a source of glass supply, of a glass blowing machine including a continuously rotatable turret provided with a plurality of vertically-disposed blow heads and a plurality of partible molds associated with the heads, a runway extending between said source of supply and the blow heads, glass-receiving cups borne by said runway and provided with vertically movable bottoms, means for discharging gathers of glass successively from said supply into said receiving cups, means for moving said receiving cups in said runway and for simultaneously moving their bottoms upwardly to transfer the gathers of glass carried thereby to said blow heads, and means for blowing said gathers in said molds.

In testimony whereof, I sign my name.
THEODORE H. SLOAN.